US012497707B2

(12) United States Patent
Sato et al.

(10) Patent No.: US 12,497,707 B2
(45) Date of Patent: Dec. 16, 2025

(54) Ag-PLATED MATERIAL, METHOD FOR PRODUCING Ag-PLATED MATERIAL, AND ELECTRICAL COMPONENT

(71) Applicant: DOWA METALTECH CO., LTD., Tokyo (JP)

(72) Inventors: Yosuke Sato, Tokyo (JP); Yutaro Hirai, Tokyo (JP); Kentaro Arai, Tokyo (JP)

(73) Assignee: DOWA METALTECH CO., LTD., Tokyo (JP)

(*) Notice: Subject to any disclaimer, the term of this patent is extended or adjusted under 35 U.S.C. 154(b) by 183 days.

(21) Appl. No.: 18/265,545

(22) PCT Filed: Jul. 14, 2021

(86) PCT No.: PCT/JP2021/026414

§ 371 (c)(1),
(2) Date: Jun. 6, 2023

(87) PCT Pub. No.: WO2022/137613

PCT Pub. Date: Jun. 30, 2022

(65) Prior Publication Data

US 2024/0026558 A1 Jan. 25, 2024

(30) Foreign Application Priority Data

Dec. 23, 2020 (JP) ................................ 2020-214110

(51) Int. Cl.

| | |
|---|---|
| ***H01R 13/03*** | (2006.01) |
| ***C25D 3/46*** | (2006.01) |
| ***C25D 5/12*** | (2006.01) |
| ***H01R 43/16*** | (2006.01) |
| *H01H 1/021* | (2006.01) |

(52) U.S. Cl.

CPC ................ *C25D 3/46* (2013.01); *C25D 5/12* (2013.01); *H01R 13/03* (2013.01); *H01R 43/16* (2013.01); *H01H 1/021* (2013.01)

(58) Field of Classification Search

CPC ............ H01B 1/00; H01B 5/00; H01R 13/03

(Continued)

(56) References Cited

U.S. PATENT DOCUMENTS

| | | | | |
|---|---|---|---|---|
| 11,211,730 B2* | 12/2021 | Shirai | ...................... | C25D 7/00 |
| 2012/0244375 A1* | 9/2012 | Chang | ..................... | C23C 28/42 204/192.15 |

(Continued)

FOREIGN PATENT DOCUMENTS

| | | | |
|---|---|---|---|
| CN | 1966779 | A | 5/2007 |
| JP | 2013-129902 | A | 7/2013 |

(Continued)

OTHER PUBLICATIONS

International Search Report and Written Opinion of the International Searching Authority issued in International Patent Application No. PCT/JP2021/026414, dated Sep. 21, 2021, along with an English translation thereof.

(Continued)

*Primary Examiner* — Chau N Nguyen

(74) *Attorney, Agent, or Firm* — GREENBLUM & BERNSTEIN, P.L.C.

(57) ABSTRACT

There is provided an Ag-plated material and a related technique, including: an Ag-plated layer on a substrate that comprises a conductive metal; and a plurality of two-layer plating structures on the substrate, the two-layer plating structures having a porous Ni-plated layer and an Ag-plated layer in this order from a substrate side.

12 Claims, 7 Drawing Sheets

EXAMPLE 1

(58) Field of Classification Search
USPC ............................................ 174/126.1, 126.2
See application file for complete search history.

(56) References Cited

U.S. PATENT DOCUMENTS

| | | | | |
|---|---|---|---|---|
| 2022/0069498 A1* | 3/2022 | Tarutani | .................. | C25D 5/14 |
| 2024/0018680 A1* | 1/2024 | Sato | ......................... | C25D 7/00 |
| 2024/0145967 A1* | 5/2024 | Wang | ....................... | C25D 5/12 |

FOREIGN PATENT DOCUMENTS

| | | | |
|---|---|---|---|
| JP | 2015-59260 | A | 3/2015 |
| JP | 2017-14588 | A | 1/2017 |
| JP | 2017-14589 | A | 1/2017 |
| WO | 2013/094766 | A1 | 6/2013 |

OTHER PUBLICATIONS

Translation of International Preliminary Report on Patentability issued in International Patent Application No. PCT/JP2021/026414, mailed Jul. 6, 2023.
Extended European Search Report that issued in corresponding European Patent Application No. 21909773.0, dated Sep. 10, 2024.
Office Action that issued in corresponding European Application No. 21909773.0, dated Sep. 8, 2025.
Niu et al., "Influence of microstructure on the wear mechanism of multilayered Ni coating deposited by ultrasound-assisted electrodeposition", Surface & Coatings Technology, vol. 210, 2012, pp. 21-27.

* cited by examiner

EXAMPLE 1

EXAMPLE 1

EXAMPLE 5

COMPARATIVE EXAMPLE 2

COMPARATIVE EXAMPLE 3

COMPARATIVE EXAMPLE 4

COMPARATIVE EXAMPLE 6

COMPARATIVE EXAMPLE 7

EXAMPLE 1

EXAMPLE 1

Ag-PLATED MATERIAL, METHOD FOR PRODUCING Ag-PLATED MATERIAL, AND ELECTRICAL COMPONENT

BACKGROUND

Technical Field

The present invention relates to an Ag-plated material, a method for producing an Ag-plated material, and an electrical component.

Description of Related Art

Conventionally, silver (Ag)-plated materials, which are conductor materials coated with silver, have been used as materials for sliding contact parts such as switches, connectors, and terminals used in automobiles and the like, to prevent oxidation of the conductor materials such as copper and copper alloys due to heating during a sliding process.

Patent document 1 discloses a plated product in which a multi-layered plated film is formed on a substrate that comprises a conductive metal, having a porous plated layer containing Ni or Cu as a main component and a surface plated layer containing Au or Ag as a main component in this order on the substrate, with a large number of pores formed on the surface of the multi-layered plated film (claim 1).

In addition, Patent document 1 discloses the following content as a reason for forming the large number of pores on the surface of the multi-layered plated film ([0020]).

That is, by forming the surface-plated layer on the porous plated layer, the surface-plated layer is formed along unevenness of the porous plated layer, and pores are also formed on the surface-plated layer. The surface-plated layer is easily formed on the projections on the surface of the porous plated layer, and is hardly formed on the bottoms and side surfaces of the pores on the surface of the porous plated layer. As a result, there will be a portion where the surface-plated layer is not formed and a portion where the surface-plated layer is thin. Due to the unevenness of the surface-plated layer containing Au or Ag as a main component, the concentration of a corrosion current that causes a galvanic corrosion can be prevented, and rather a corrosion resistance improves.

Patent document 2 discloses that the surface of the plated film described in Patent document 1 has a large number of pores, and the pores are filled with lubricating particles by blasting to provide slidability (abstract).

Patent document 3 discloses an electrical contact material for connectors with excellent wear resistance, having a substrate that comprises a metal material, a porous metal layer having a large number of pores provided on the substrate, and filling portions filled in the pores on the porous metal layer, the filling portions comprising a metal material having a hardness lower than that of the metal material comprised in the porous metal layer, to thereby maintain good electrical connectivity for a long period of time even when the connector is repeatedly inserted and removed (abstract, claim 1).

Patent documents 4 and 5 disclose a silver-plated material whose silver surface layer is formed on the surface of a nickel underlayer formed on the substrate, with excellent wear resistance, in which in order to improve the productivity of the silver-plated material, the surface of the substrate is roughened, and after forming the nickel underlayer on the roughened surface of the substrate, or after forming the nickel underlayer on the substrate and roughening the surface of the underlayer, a surface layer comprising silver is formed on the surface of this underlayer (abstract, claim 1).

PRIOR ART DOCUMENT

Patent Document

[Patent Document 1] WO2013/094766 Pamphlet
[Patent Document 2] JP-A-2013-129902
[Patent Document 3] JP-A-2015-59260
[Patent Document 4] JP-A-2017-14588
[Patent Document 5] JP-A-2017-14589

In recent years, demand for electric vehicles such as EVs and PHVs is increasing due to problems under environmental regulations. A silver-plated wrought copper material is often used for electrified vehicles, from a viewpoint of electrical conductivity and contact reliability.

Properties required for such a high-voltage terminal include insertion/removal resistance and wear resistance (collectively referred to as wear resistance in this specification), and preferably include a performance (vibration resistance) to withstand fretting wear.

An object of the present invention is to provide an Ag-plated material with excellent wear resistance.

Means for Solving the Problem

A first aspect of the present invention provides an Ag-plated material, including:

- an Ag-plated layer on a substrate that comprises a conductive metal; and
- a plurality of two-layer plating structures on the substrate, the two-layer plating structures having a porous Ni-plated layer and an Ag-plated layer in this order from a substrate side.

A second aspect of the present invention provides the Ag-plated material according to the first aspect, further including:

- an underlying Ni-plated layer between the two-layer plating structure closest to the substrate, and the substrate.

A third aspect of the present invention provides the Ag-plated material according to the second aspect, wherein the underlying Ni-plated layer has a thickness of 0.05 to 2 μm.

A fourth aspect of the present invention provides the Ag-plated material according to any one of the first to third aspects, wherein the Ag-plated material has a large number of pores on its surface.

A fifth aspect of the present invention provides the Ag-plated material according to the fourth aspect, wherein a number density of the pores is 5000 to 100,000/mm$^2$.

A sixth aspect of the present invention provides the Ag-plated material according to the fourth or fifth aspect, wherein the pores have an average diameter of 1 to 30 μm.

A seventh aspect of the present invention provides the Ag-plated material according to any one of the first to sixth aspects, wherein the porous Ni-plated layer has a thickness of 0.1 to 3 μm.

An eighth aspect of the present invention provides the Ag-plated material according to any one of the first to seventh aspects, wherein the Ag-plated layer has a thickness of 0.1 to 3 μm.

A ninth aspect of the present invention provides a method for producing an Ag-plated material, which is a method for producing an Ag-plated material including an Ag-plated layer on a substrate that comprises a conductive metal, the method including:

- forming a two-layer plating structure having a porous Ni-plated layer and an Ag-plated layer in this order from a substrate side on the substrate; and
- forming a plurality of layers of this two-layer plating structure.

A tenth aspect of the present invention provides the method for producing an Ag-plated material according to the ninth aspect, including:

- further forming an underlying Ni-plated layer between the two-layer plating structure closest to the substrate, and the substrate.

An eleventh aspect of the present invention provides the method for producing an Ag-plated material according to the tenth aspect, wherein the underlying Ni-plated layer has a thickness of 0.05 to 2 μm.

A twelfth aspect of the present invention provides the method for producing an Ag-plated material according to any one of the ninth to eleventh aspect, wherein the porous Ni-plated layer has a thickness of 0.1 to 3 μm.

A thirteenth aspect of the present invention provides the method for producing an Ag-plated material according to any one of the ninth to twelfth aspect, wherein the Ag-plated layer has a thickness of 0.1 to 3 μm.

A fourteenth aspect of the present invention provides an electrical component that is a contact or terminal component using the Ag-plated material according to any one of the first to eighth aspects as a material.

Advantage of the Invention

According to the present invention, an Ag-plated material with excellent wear resistance can be provided.

DETAILED DESCRIPTION OF THE INVENTION

Figure 1:
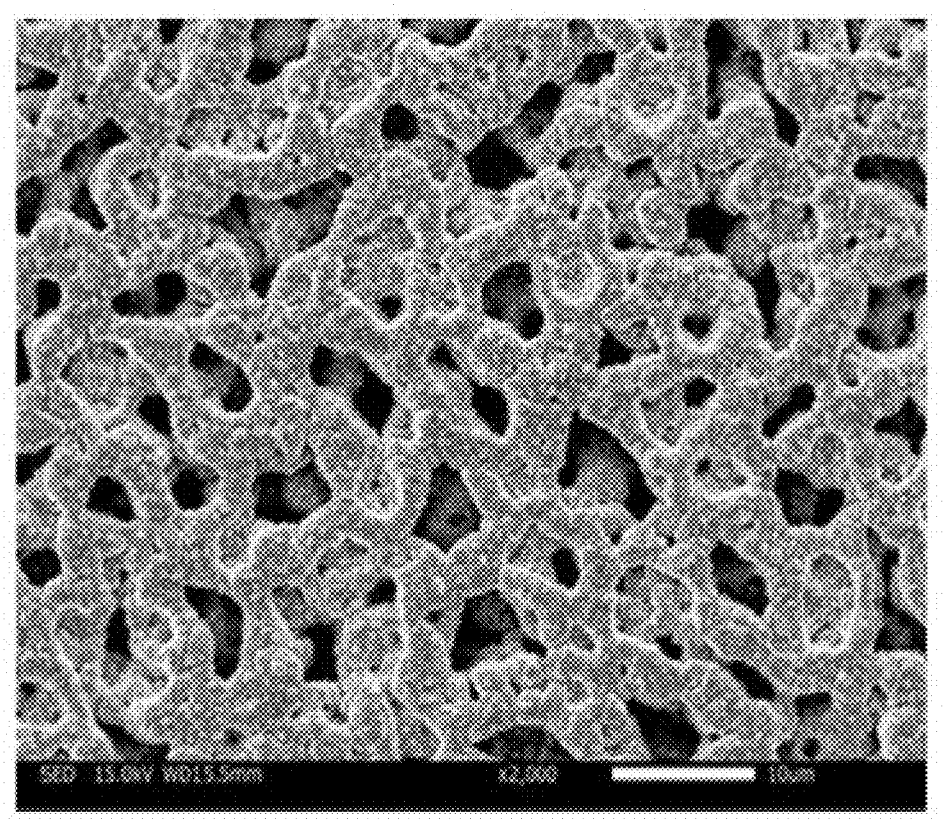
FIG. 1 is a secondary electron image (2000×) of a surface of an Ag-plated material of example 1, using SEM (scanning electron microscope).

The present embodiment will be described below. In this specification, "–" refers to a predetermined numerical value or more and a predetermined numerical value or less.

<Ag Plated Material>

An Ag-plated material according to the present embodiment is an Ag-plated material, including: an Ag-plated layer on a substrate that comprises a conductive metal; and a plurality of two-layer plating structures on the substrate, the two-layer plating structures having a porous Ni (nickel) plated layer and an Ag (silver) plated layer in this order from a substrate side (lower side).

The substrate is not limited as long as it comprises a conductive metal, and may be copper or a copper alloy.

The porous Ni-plated layer is, as the name suggests, a porous plated layer.

The porous Ni-plated layer is a porous Ni-plated film having a three-dimensional structure that can be produced, for example, by a known porous Ni plating solution and electrolytic plating method, and when observed from the surface, each pores having a diameter of about 1 μm to several tens of μm, and has a high specific surface area.

The porous Ni-plated layer is a plated layer containing Ni as a main component, and may contain other elements such as P, B, Co, Fe, Cr, Cu, Zn, etc. within a range in which the effects of the present invention are exhibited. Hereinafter, the Ni-plated layer and Ag-plated layer mean that Ni and Ag are main components, respectively.

Specifically, the content of Ni in the porous Ni-plated layer is, for example, 90% by mass or more, preferably 95% by mass or more, and more preferably 99% by mass or more.

It is preferable that the porous Ni-plated layer has a thickness of 0.1 to 3 μm. With this thickness, the Ni-plated layer can be made porous after appropriately setting the number density of the pores and the average diameter of the pores. The thickness of the porous Ni-plated layer is more preferably 0.3 to 2 μm, still more preferably 0.8 μm or more.

The Ag-plated layer may be an Ag-plated film obtained by applying Ag plating (main plating) after applying Ag strike plating. Then, it is a plated layer containing Ag as a main component. Other elements such as C, N, S, Se, Sb, Co, Cu, Au, In, P, Zn, Sn, Pd, Bi, etc., may be contained in the Ag-plated layer within a range in which the effects of the present invention are exhibited. For convenience, in this specification, in order to distinguish between the Ag strike plated layer and the Ag-plated layer formed thereon, the Ag-plated layer on the Ag strike plated layer may be referred to as a main Ag-plated layer.

Specifically, the content of Ag in the Ag-plated layer is, for example, 90% by mass or more, preferably 95% by mass or more, and may be 99% by mass or more from a viewpoint of conductivity.

A large number of pores are preferably formed on the surface of the Ag-plated material. That is, a large number of pores are preferably observed on an outermost surface side (exposed surface) of the plurality of Ag-plated layers. Further, a large number of pores may be observed on any upper surface of the Ag-plated layer that constitutes the Ag-plated material. It can be considered that the pores of the Ag-plated layer are observed so that the surface of the porous Ni-plated layer, which is formed under the Ag-plated layer and covered with the Ag-plated layer, is not covered with Ag plating until the pore portions of the porous Ni-plated layer is completely filled.

Figure 2:
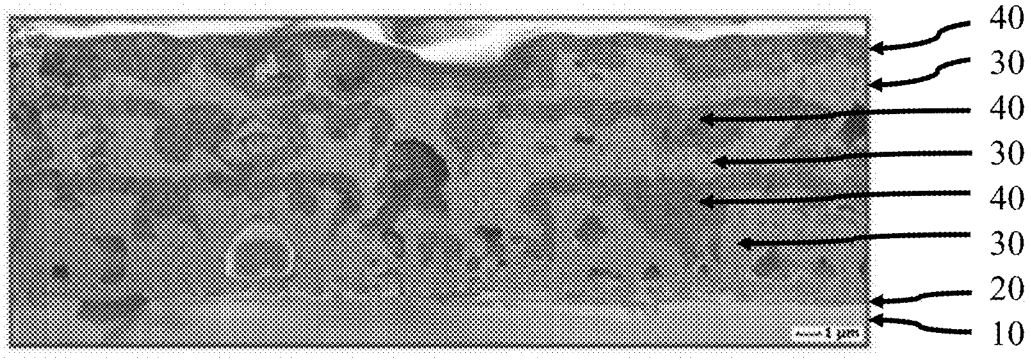
FIG. 2 is a SIM (scanning ion microscope) image of the cross section of the Ag-plated material of example 1.

A two-layer plating structure having the porous Ni-plated layer and the Ag-plated layer in this order (alternately overlapping) is formed from the substrate side, and the presence of the plurality of two-layer plating structures can be confirmed by observing the cross section using an electron microscope. For example, FIG. 2 is a SIM image (scanning ion microscope image) obtained by observing the cross section of the Ag-plated material of the present invention (example 1) using a SIM (scanning ion microscope). From FIG. 2, it can be confirmed that a two-layer plating structure having the porous Ni-plated layer 30 and the Ag-plated layer 40 in this order is formed, and that a plurality (three in FIG. 2) of the two-layer plating structures (each two-layer plating structure including a respective porous Ni-plated layer 30 and Ag-plated layer 40) are provided. More preferably, three or more two-layer plating structures are provided. The porous Ni-plated layer 30 is a light gray layer and the Ag-plated layer 40 is a dark gray layer. Unevenness (pores) is observed in the porous Ni-plated layer, and Ag plating is formed on the surface thereof.

Further, a number density of pores on the surface of the Ag-plated material and a diameter of the pores were evaluated. A shape measurement was performed with an objective lens×100 using a laser microscope VK-X150 manufactured by Keyence Corporation, and volume and area measurements were performed in an analysis range of 100 μm×100 μm, using a multi-file analysis application. With a height of a largest detected area as a reference (height 0) (calculated by the analysis application), a portion where an object (plated surface) was not detected at a distance (position) of 0.5 μm in a depth direction of the Ag-plated layer from the reference height is regarded as a pore (porous portion), to measure the number and area of the pores. Then the number density of the pores per unit area and the average diameter of the pores were calculated. Pores having a diameter of less than 1 μm were excluded from the measurement targets.

Further, a large number of pores (unevennesses) are formed on the upper surface of the Ag-plated layer other than the outermost layer constituting the Ag-plated material (surface side of the Ag-plated material), and the porous Ni-plated layer is formed on the upper surface of the Ag-plated layer.

It is preferable that the number density of the pores on the surface of the Ag-plated material is 5,000 to 100,000/mm$^2$.

The average diameter of the pores is preferably 1 to 30 μm, more preferably 2 to 20 μm.

The Ag-plated layer preferably has a thickness of 0.1 to 3 μm, more preferably 0.2 to 2 μm. With this thickness, a large number of pores can be formed on the Ag-plated layer after appropriately setting the number density of the pores and the average diameter of the pores. When the thickness is more than 3 μm, the pores on the surface of the porous Ni-plated layer may be filled with the Ag-plated layer, resulting in insufficient formation of a large number of pores on the surface. However, the above numerical range is only an example, and after all, the thickness of the Ag-plated layer may be any thickness that allows a large number of pores to be formed on the upper surface of the Ag-plated layer. It is more preferable that any Ag-plated layer constituting the Ag-plated material has a thickness that allows a large number of pores to be formed on the upper surface of the Ag-plated layer, and specifically, the thickness is more preferably 0.2 to 2 μm, and still more preferably 0.5 μm or more.

In the present embodiment, a plurality of two-layer plating structures each having a pair of the porous Ni-plated layer and the Ag-plated layer formed directly thereon are provided. With this configuration, the Ag-plated material of the present embodiment has excellent wear resistance and preferably has excellent vibration resistance.

It is preferable that the underlying Ni-plated layer is further formed between the two-layer plating structures closest to the substrate, and the substrate. Particularly, it is preferable to form the underlying Ni-plated layer directly on the substrate and form the porous Ni-plated layer directly on the underlying Ni-plated layer.

By forming the underlying Ni-plated layer, for example, when the Ag-plated material is heated, elements such as Cu and Fe, which are components of the substrate, can be prevented from diffusing into the Ag-plated layer, and deterioration of properties such as deterioration of adhesion between the substrate and the porous Ni-plated layer can be suppressed.

When good adhesion can be ensured between the substrate (or a layer when some layer is formed on the substrate) and the porous Ni-plated layer, there is no limitation on the underlying Ni-plated layer. The thickness of the underlying Ni-plated layer is preferably 0.05 to 2 μm, from a viewpoint of good adhesion and bending workability.

<Method for Producing the Ag-Plated Material>

There is provided a method for producing an Ag-plated material of the present embodiment, which is a method for producing an Ag-plated material including an Ag-plated layer on a substrate that comprises a conductive metal, the method including:

- forming a two-layer plating structure on the substrate, the two-layer plating structure having a porous Ni-plated layer and an Ag-plated layer in this order from a substrate side; and
- forming a plurality of layers of this two-layer plating structure.

Contents not described below are the same as those described in the <Ag-plated material> item.

(Step 1: Pretreatment Step)

As a pretreatment, electrolytic degreasing and pickling are preferably performed to the substrate. For example, with the substrate as a cathode and a separately prepared SUS plate as an anode, electrolytic degreasing is preferably performed, to remove organic substances on the substrate. Thereafter, the substrate is preferably pickled with an aqueous solution containing an acid such as a sulfuric acid.

(Step 2: Underlying Ni-Plated Layer Forming Step)

Next, it is preferable to form an underlying Ni-plated layer. There are no restrictions on the configuration (composition) of the plating bath and plating conditions when forming the underlying Ni-plated layer, and a plating bath (sulfamic acid bath; comprising nickel sulfamate and boric acid, nickel chloride, etc.) and plating conditions listed in the examples below can be used. Other plating baths include a Watts bath (comprising nickel sulfate and nickel chloride, boric acid, etc.) and an all-chloride bath (comprising nickel chloride and boric acid, etc.).

The Ni concentration in the underlying Ni plating solution is preferably 5 to 200 g/L, more preferably 10 to 180 g/L, most preferably 20 to 150 g/L, and electroplating is preferably performed using such a plating solution.

The temperature of the plating solution for forming the underlying Ni-plated layer is preferably 10 to 70° C., more preferably 25 to 55° C. A current density is preferably 15 $A/dm^2$ or less, more preferably 10 $A/dm^2$ or less, still more preferably 0.5 to 7 $A/dm^2$.

(Step 3: Porous Ni-Plated Layer Forming Step)

It is preferable to form a porous Ni-plated layer directly on the underlying Ni-plated layer. There are no restrictions on the configuration (composition) of the plating bath (liquid) and plating conditions when forming the porous Ni-plated layer, and it is sufficient that plating is performed in a plating bath containing Ni ions to form the porous plated layer containing Ni as a main component.

Specifically, examples of methods include a method of electroplating in a plating bath to which a water-soluble quaternary ammonium salt containing Ni ions and having a hydrophobic group is added. The quaternary ammonium salt can be added to a known Ni electroplating bath.

Examples of known electroplating baths include Watts bath, Ni sulfamate bath, and Ni organic acid bath.

The Ni concentration in this porous Ni plating solution is preferably to 200 g/L, more preferably 10 to 180 g/L, most preferably 20 to 150 g/L.

The temperature of the plating solution for forming the porous Ni-plated layer is preferably 10 to 70° C., more preferably 25 to 55° C. The current density is preferably 15 $A/dm^2$ or less, more preferably 10 $A/dm^2$ or less, still more preferably 0.5 to 7 $A/dm^2$.

(Step 4: Ag Strike Plated Layer Forming Step)

It is preferable to form an Ag strike plated layer directly on the porous Ni-plated layer. The composition of the plating bath and the plating conditions for forming the Ag strike plated layer are not limited, and known plating baths and plating conditions can be applied. Further, the plating baths and plating conditions listed in the examples below can be used.

Ag concentration in this Ag strike plating solution is preferably 0.01 to 15 g/L, more preferably 0.1 to 10 g/L, most preferably 0.2 to 5 g/L. Further, Ag strike plating is preferably performed by electroplating.

The temperature of the plating solution for forming the Ag strike plated layer is preferably 10 to 60° C., more preferably 15 to 55° C. The current density is preferably 8 $A/dm^2$ or less, more preferably 5 $A/dm^2$ or less, still more preferably 0.2 to 3 $A/dm^2$.

(Step 5: Main Ag-Plated Layer Forming Step)

It is preferable to form a main Ag-plated layer directly on the Ag strike plated layer. The composition of the plating bath and the plating conditions for forming the main Ag-plated layer are not limited, and the plating baths and plating conditions described in the examples below can be used. The thickness of the main Ag-plated layer may be set to a thickness at which a large number of pores are formed in the main Ag-plated layer, and formation by electroplating is preferable.

The Ag concentration in this main Ag-plated solution is preferably 5 to 200 g/L, more preferably 20 to 180 g/L, and most preferably 50 to 150 g/L.

The temperature of the plating solution for forming the main Ag-plated layer is preferably 10 to 60° C., more preferably 15 to 55° C. The current density is preferably 15 $A/dm^2$ or less, more preferably 10 $A/dm^2$ or less, still more preferably 0.5 to 7 $A/dm^2$.

In the Ag strike plated layer and the main Ag-plated layer formed on the Ag strike plated layer, for example, even when the cross section of the Ag plating material is observed using a microscope, the thickness of the Ag strike plated layer is very thin, and the composition is also Ag and it is difficult to distinguish. Therefore, these Ag strike plated layer and the main Ag-plated layer are regarded as a single Ag-plated layer.

Next, the set of (step 3) to (step 5) is repeated. Then, a desired number (plurality) of two-layer plating structures are formed, and then, washing with water was appropriately performed, to obtain an Ag-plated material.

When producing electrical components such as switches, connectors, contacts or terminal parts using the Ag-plated material of the present embodiment as a material, the electronic components with excellent wear resistance and vibration resistance can be obtained.

The technical scope of the present invention is not limited to the above-described embodiments, and includes various modifications and improvements within a range where specific effects obtained by the constituent elements of the invention and their combinations can be derived.

EXAMPLES

Next, the present invention will be specifically described by showing examples. The present invention is not limited to the following examples. Contents not described below are the same as those described in the present embodiment.

[Example 1] (Step 1: Pretreatment (Electrolytic Degreasing and Pickling))

First, a pure copper metal plate (C1020) of 67 mm×50 mm×0.3 mm was prepared as a substrate 10 (see FIG. 2), and this substrate and a separately prepared SUS plate were placed in an alkaline degreasing solution, and this substrate and the separately prepared SUS plate were placed in an alkaline degreasing solution, and electrolytically degreased at a voltage of 5 V for 30 seconds with the substrate as a cathode and the SUS plate as an anode. Thereafter, the substrate was pickled in a 3% sulfuric acid aqueous solution for 15 seconds. Washing with water was performed for 15 seconds between each operation.

(Step 2: Formation of Underlying Ni-Plated Layer)

Next, a plating solution (bath) that comprises an aqueous solution containing 540 g/L of nickel sulfamate tetrahydrate, 25 g/L of nickel chloride and 35 g/L of boric acid was prepared. Then, in the plating solution, with the substrate 10 as a cathode and the separately prepared SK (sulfur-containing) nickel electrode plate as an anode, electroplating was performed at a current density of 7 $A/dm^2$ and a liquid temperature of 50° C. while stirring at 500 rpm with a magnetic stirrer, to form (as seen in FIG. 2) an underlying Ni-plated layer 20 having a thickness of 0.2 μm directly on the substrate 10.

(Step 3: Formation of the Porous Ni-Plated Layer)

Next, a plating solution that comprises 540 g/L of nickel sulfamate tetrahydrate, 25 g/L of nickel chloride, 35 g/L of boric acid, and 10 mL/L of top porous nickel RSN (manufactured by Okuno Chemical Industry Co., Ltd.) as an additive for nickel plating to obtain a nickel plating film having a porous structure, was prepared. A total amount of the plating solution was 1 L.

Then in the plating, with the substrate on which the underlying Ni-plated layer was formed (hereinafter, the intermediate is referred to as the "plated material") as the cathode, and the SK nickel electrode plate as the anode, electroplating was performed for 500 seconds at a current density of 1 A/dm$^2$ and a liquid temperature of 50° C., while stirring at 500 rpm with a magnetic stirrer, to form Ni having a volume corresponding to a non-porous Ni-plated layer having a thickness of 1 μm (set value), and form a porous Ni-plated layer directly on the underlying Ni-plated layer. The thickness of the porous Ni-plated layer (set value above) at that time is shown in Table 1 below.

For material after formation of the porous Ni-plated layer, the thickness of the Ni-plated layer at a central part of the sample was measured under conditions of a collimator diameter of 0.2 mm and a measurement time of 10 sec, using a fluorescent X-ray film thickness gauge (FT-110A manufactured by Hitachi High-Tech Science Co., Ltd.). As a result, it was confirmed that the film thickness was 1.2 μm, which was a set value. From a measurement principle of the fluorescent X-ray film thickness gauge, it is considered that the sum of the thicknesses of the underlying Ni-plated layer and the porous Ni-plated layer is measured as the thickness of the Ni-plated layer.

(Step 4: Formation of Ag Strike Plated Layer)

Next, a plating solution that comprises an aqueous solution containing 3 g/L of potassium silver cyanide and 90 g/L of potassium cyanide was prepared. Then in the plating solution, with a material to be plated as a cathode, and a platinum-coated titanium electrode plate as an anode, electroplating was performed for 10 seconds at a liquid temperature of 25° C. and a current density shown in the table, while stirring at 500 rpm with a magnetic stirrer, and then washing with water was performed for 15 seconds.

(Step 5: Formation of the Main Ag-Plated Layer)

Next, a silver plating bath that comprises an aqueous solution containing 175 g/L of potassium silver cyanide, 95 g/L of potassium cyanide and 6 mg/L of selenium was prepared. In the plating bath, with the material to be plated as a cathode and a silver electrode plate with a purity of 99.99% or more as an anode, and in order to form the Ag-plated layer having a thickness of 1 μm (set value), electroplating was performed for 240 seconds at a current density of 0.5 A/dm$^2$ and a liquid temperature of 18° C., while stirring at 500 rpm with a magnetic stirrer, to form a main Ag-plated layer directly on the Ag strike plated layer. The thickness of the Ag-plated layer in Table 1 is a total thickness (above set value) of the Ag strike plated layer and the main Ag-plated layer. After forming the main Ag-plated layer, washing with water was performed for 15 seconds.

For the material after the formation of the Ag-plated layer, the thickness of the Ag-plated layer at the center of the sample was measured under conditions of a collimator diameter of φ0.2 mm and a measurement time of 10 seconds, using a fluorescent X-ray film thickness gauge (FT-110A manufactured by Hitachi High-Tech Science Co., Ltd.). As a result, it was confirmed that the film thickness was 1 μm, which was a set value.

Next, (the set of) (step 3) to (step 5) are repeated twice to produce an Ag-plated material comprising a total of seven plated layers including the underlying Ni-plating layer (the Ag strike plated layer is counted as one layer together with the main Ag-plated layer).

(Plated Film Thickness)

The film thickness of each layer of the produced Ag-plated material was measured for Ag and Ni while etching the surface of the Ag-plated material in a depth direction by Ar sputtering (acceleration voltage 3 kV, emission current 25 mA), under conditions of an acceleration voltage of 10 kV, an irradiation current of $1\times10^{-7}$ A, and a beam diameter of 100 μmφ, using an Auger electron spectrometer (Auger microprobe JAMP-7800 manufactured by JEOL Ltd.), to calculate the plating thickness from a depth profile of Ag and Ni. A measurement data step interval was 0.5 minutes between 0 and 300 seconds, 1 minute between 300 and 600 seconds, and 2 minutes above 600 seconds.

Figure 11:
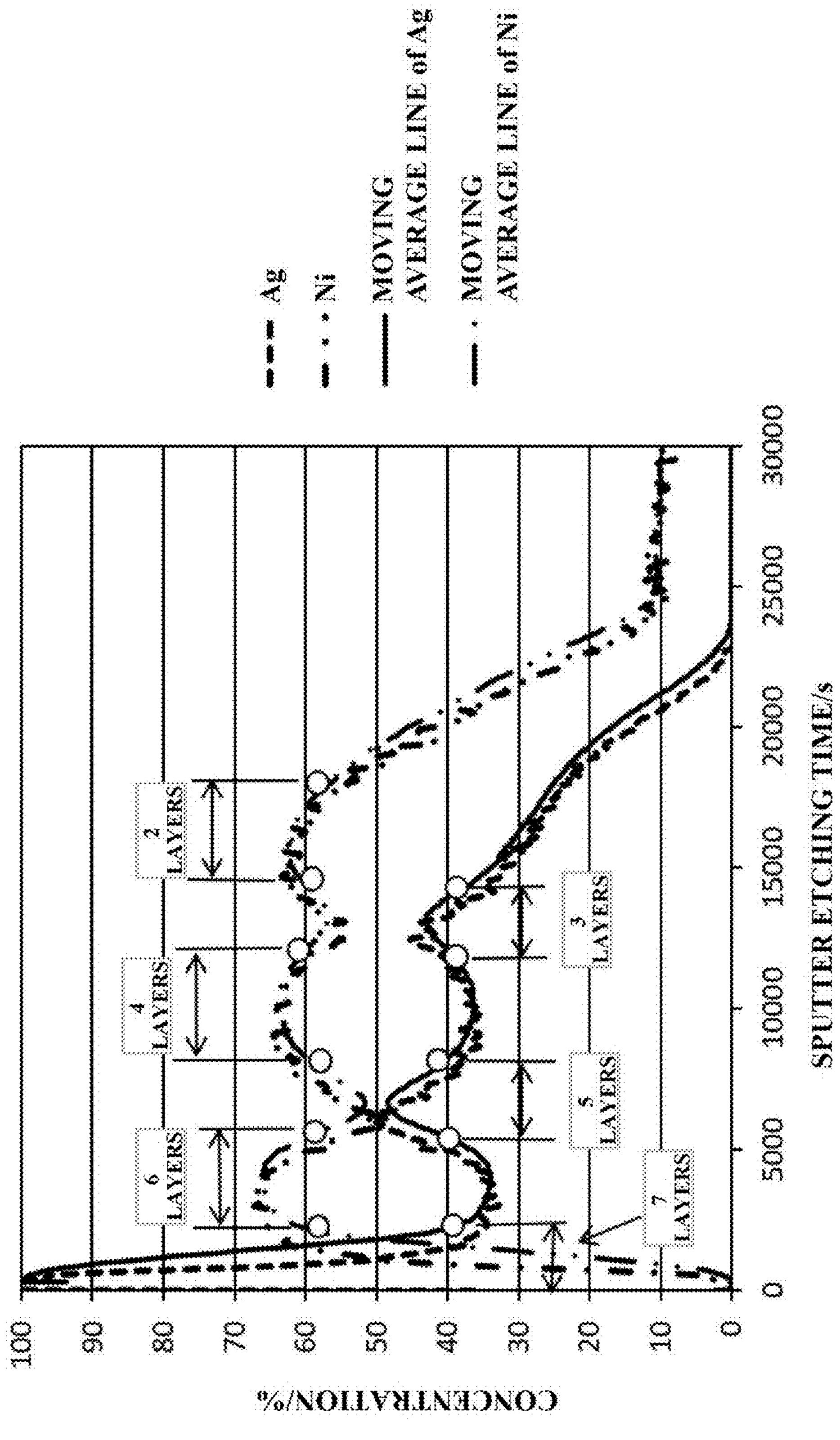
FIG. 11 is a view for explaining a method for calculating a plated film thickness.

A measurement example is shown in FIG. 11. A method for calculating the plated film thickness will be described below.

FIG. 11, shows a depth profile (depth profile) of Ag and Ni, where a horizontal axis indicates the sputtering time and a vertical axis indicates the concentration (atomic percentage). Regarding measured data in this depth profile, a 10-section moving average is calculated to create a moving average line.

Local maximum and minimum values on each moving average line are plotted (not shown) (Ag moving average line has 2 local maximum values and 2 local minimum values, Ni moving average line has 3 local maximum values and 2 local minimum values, except for an outermost surface), and (further, a value obtained by dividing the sum of the adjacent (concentration) local maximum and minimum values of the moving average lines of each of Ag and Ni by 2 is defined as a median value, and the median value was plotted on a line segment between the local maximum and minimum values and set as a midpoint (indicated by a white circle in the figure).

In the moving average line of the profile of Ag in the depth direction, the midpoint on the side (outermost surface side) where the sputtering time is smaller than the local minimum value closest to the surface is the midpoint plotted on the moving average line (between the local minimum value and the outermost surface) where the concentration is the same as the midpoint plotted adjacent to the local minimum value and on the side of larger sputtering time.

Further, in the moving average line of the profile in the depth direction of Ag, the midpoint on the side (substrate side) where the sputtering time is larger than the local maximum value closest to the substrate is the midpoint plotted on the moving average line (between the local maximum value and the substrate) where the concentration is the same as the midpoint plotted adjacent to the local maximum value and on the side of smaller sputtering time.

In the moving average line of the profile of Ni in the depth direction, the midpoint on the side where the sputtering time is smaller than the local maximum value closest to the surface (outermost surface side) is the midpoint plotted on the moving average line (between the local maximum value and the outermost surface) where the concentration is the same as the midpoint plotted adjacent to the local maximum value and on the side of larger sputtering time.

In the moving average line of the profile of Ni in the depth direction, the midpoint on the side (substrate side) where the sputtering time is larger than the local maximum value closest to the substrate is the midpoint plotted on the moving average line (between the local maximum value and the substrate) where the concentration is the same as the midpoint plotted adjacent to the local maximum value and on the side of smaller sputtering time.

Then, in each moving average line of Ag and Ni, these adjacent midpoints are connected with a line, a length in a horizontal axis direction (sputtering time) of a section where the local maximum value is above this line was measured, and this length was converted into a thickness from an etching rate of $SiO_2$ (etching rate of 20 nm/min), to obtain a plated film thickness of each of the Ag-plated layer and the Ni-plated layer.

For the Ag-plated layer on the outermost surface (indicated by 7 layers in the figure), the length (time) on the horizontal axis from the outermost surface (sputtering time is zero) to the midpoint closest to the outermost surface was converted to the above etching rate to obtain the thickness of the Ag-plated layer. The plating thickness defined in the claims of the present invention is calculated by such a method.

The result is that the thickness of the Ag-plated layer (7 layers) was μm, the thickness of the porous Ni-plated layer (6 layers) was 1.148 μm, the thickness of the Ag-plated layer (5 layers) was 0.739 μm, the thickness of the porous Ni-plated layer (4 layers) was 1.453 μm, the thickness of the Ag-plated layer (3 layers) was 0.69 μm, and the thickness of the porous Ni-plated layer (2 layers) was 1.099 nm, in an order from the surface side of the Ag-plated material.

(Wear Resistance of the Ag-Plated Material)

In order to evaluate the wear resistance of the produced silver-plated material, and using a precision sliding tester CRS-G2050-DWA type, one of the silver-plated material is processed into an embossed shape (hemispherical shape) having an inner diameter R=1.5 mm, and after contacting the plate surface of the other (same plate-shaped) silver-plated material with a load of 5 N, it slides back and forth at a sliding speed of 1.67 mm/sec and a sliding distance of 5 mm, and the number of times until the copper substrate was exposed was measured. However, when the contact resistance exceeded 1 mΩ, it was determined as NG at that point. The result is that in the Ag-plated material of example 1, the copper substrate was not exposed even after sliding 1,000 times, and the contact resistance was less than 1 mΩ, indicating excellent wear resistance.

(Vibration Resistance of the Ag-Plated Material (Microsliding Wear Resistance))

In order to evaluate the wear resistance of the produced silver-plated material, and using a precision sliding tester CRS-G2050-DWA manufactured by Yamazaki Seiki Laboratory Co., Ltd., one side of the silver-plated material was processed into an embossed shape (hemispherical shape) having an inner diameter R=1.5 mm, and after contacting the plate surface of the other (same plate-shaped) silver-plated material with a load of 5 N, it was reciprocated at a sliding speed of 0.2 mm/sec and a sliding distance of 0.1 mm, and the number of times until the contact resistance became 1 mΩ or more was measured.

The result is that the Ag-plated material of example 1 had a contact resistance of less than 1 mΩ even after sliding 50,000 times, indicating excellent vibration resistance.

(Number Density of Pores on the Surface of the Ag-Plated Material and an Average Diameter of the Pores)

The number density of pores and average diameter of the pores observed on the surface of the Ag-plated material were evaluated.

Using a laser microscope VK-X150 manufactured by Keyence Corporation, shape measurement was performed using an objective lens 100×, and a volume and an area were measured using a multi-file analysis application, with an analysis range of 100 μm×100 μm.

In the analysis range, with a height of a largest area detected as a surface (calculated by the analysis application), a portion where an object (plated surface) was not detected at a distance (position) of 0.5 μm in a depth direction from the surface is regarded as a pore (porous portion), the number and area of the pores were calculated. Then, an average area of the pores was calculated from the measured number of pores and the area of the pores, and a diameter of a circle having the same area as the average area of the pores was calculated as an average diameter of the pores. Further, a number density of the pores per unit area was calculated from the measurement result.

The result is that the number density of the pores was 9,300/$mm^2$, and the average diameter of the pores was 16.3 μm.

The composition, evaluation results, etc. of the Ag-plated material in each example are shown in Table 1 below.

TABLE 1

| | Plating composition | | | | | | | | |
|---|---|---|---|---|---|---|---|---|---|
| | 1 layer (sub. side) | 2 lyrs. | 3 lyrs. | 4 lyrs. | 5 lyrs. | 6 lyrs. | 7 lyrs. | 8 lyrs. | 9 lyrs. |
| Example 1 | Ni 0.2 μm | PNi 1 μm | Ag 1 μm | PNi 1 μm | Ag 1 μm | PNi 1 μm | Ag 1 μm | | |
| Example 2 | Ni 0.2 μm | PNi 1 μm | Ag 1 μm | PNi 1 μm | Ag 1 μm | PNi 1 μm | Ag 1 μm | | |
| Example 3 | Ni 0.2 μm | PNi 1 μm | Ag 1 μm | PNi 1 μm | Ag 1 μm | | | | |
| Example 4 | Ni 0.2 μm | PNi 1 μm | Ag 1 μm | PNi 1 μm | Ag 1 μm | PNi 1 μm | Ag 1 μm | PNi 1 μm | Ag 1 μm |
| Example 5 | Ni 0.2 μm | D | E | D | E | D | E | | |
| Example 6 | Ni 0.2 μm | D | E | D | E | D | E | D | E |
| Example 7 | Ni 0.2 μm | D | E | D | E | | | | |
| Com. Ex. 1 | Ni 0.2 μm | PNi 1 μm | Ag 1 μm | | | | | | |
| Com. Ex. 2 | Ni 0.2 μm | PNi 1 μm | Ag 3 μm | | | | | | |
| Com. Ex. 3 | Ni 0.2 μm | PNi 1 μm | Ag 5 μm | | | | | | |
| Com. Ex. 4 | Ni 0.2 μm | PNi 1 μm | Ag 5 μm | | | | | | |
| Com. Ex. 5 | Ni 0.2 μm | PNi 1 μm | Ag 5 μm | | | | | | |
| Com. Ex. 6 | Ni 0.2 μm | PNi 3 μm | Ag 3 μm | | | | | | |
| Com. Ex. 7 | Ni 1 μm | Ag 1 μm | Ni 1 μm | Ag 1 μm | Ni 1 μm | Ag 1 μm | | | |
| Com. Ex. 8 | Ni 1 μm | Ag 5 μm | | | | | | | |

TABLE 1-continued

| | Current density | | | A | | Evaluation | |
|---|---|---|---|---|---|---|---|
| | PNi | Ag strike plating | Ag | B | C | Wear resistance | Vibration resistance |
| Example 1 | 1A/dm2 | 1A/dm2 | 0.5 A/dm2 | 9,300 | 16.3 | 1000 times or more | 50000 times or more |
| Example 2 | 1A/dm2 | 1A/dm2 | 5 A/dm2 | 10,800 | 16.2 | 1000 times or more | 50000 times or more |
| Example 3 | 1A/dm2 | 1A/dm2 | 5 A/dm2 | 25,500 | 7.1 | 1000 times or more | 13000 times or more |
| Example 4 | 1A/dm2 | 1A/dm2 | 5 A/dm2 | 23,100 | 7.7 | 1000 times or more | 50000 times or more |
| Example 5 | 1A/dm2 | 1A/dm2 | 5 A/dm2 | 43,400 | 4.9 | 400 times of more | 20000 times of more |
| Example 6 | 1A/dm2 | 1A/dm2 | 5 A/dm2 | 38,800 | 4.5 | 800 times of more | 50000 times or more |
| Example 7 | 1A/dm2 | 1A/dm2 | 5 A/dm2 | 36,600 | 6.0 | 150 times or more | 10000 times or more |
| Com. Ex. 1 | 1/dm2 | 1A/dm2 | 5 A/dm2 | 18,800 | 9.0 | Less than 100 times | Less than 5000 times |
| Com. Ex. 2 | 1Adm2 | 1A/dm2 | 0.5 A/dm2 | 12,400 | 9.4 | Less than 100 times | Less than 2000 times |
| Com. Ex. 3 | 1A/dm2 | 1A/dm2 | 0.5 A/dm2 | 0 | — | Less than 100 times | Less than 5000 times |
| Com. Ex. 4 | 3A/dm2 | 2A/dm2 | 0.5 A/dm2 | 0 | — | Less than 100 times | — |
| Com. Ex. 5 | 5A/dm2 | 2A/dm2 | 0.5 A/dm2 | 0 | — | Less than 100 times | — |
| Com. Ex. 6 | 1A/dm2 | 1A/dm2 | 0.5 A/dm2 | 4,600 | 31.2 | Less than 100 times | Less than 3000 times |
| Com. Ex. 7 | — | 2A/dm2 | 0.5 A/dm2 | 0 | — | Less than 100 times | Less than 5000 times |
| Com. Ex. 8 | — | 2A/dm2 | 5 A/dm2 | 0 | — | Less than 100 times | Less than 5000 times |

*A value of a plate structure indicates a set-value of a thickness of each film
*PNi indicates a Ni-plated layer
*sub.side = substrate side
*lyrs. = layers
A = Pores on the outermost surface
B = Pores Number density(number/mm$^2$)
C = Pore size Average diameter (μm)
D = PNi 0.5 μm
E - Ag 0.5 μm Example 2

In example 2, an Ag-plated material was produced in the same manner as in example 1, except that a plating solution that comprises an aqueous solution containing 540 g/L of nickel sulfamate tetrahydrate, 25 g/L of nickel chloride, 35 g/L of boric acid, and 8 mL/L of top porous nickel RSN (manufactured by Okuno Pharmaceutical Co., Ltd.) which is an additive for nickel plating to obtain a nickel-plated film having a porous structure, was used as a composition of the Ni plating solution for porous Ni plating, and a plating solution that comprises an aqueous solution containing 175 g/L of potassium silver cyanide, 95 g/L of potassium cyanide, and 55 mg/L of selenium, was prepared as a composition of the Ag plating solution for main Ag plating in the step of forming the main Ag-plated layer, with the material to be plated as a cathode and a silver electrode plate with a purity of 99.99% by mass or more as an anode, and in order to form the Ag-plated layer having a thickness of 1 μm, electroplating was performed for 24 seconds at a current density of 5 A/dm$^2$ and a liquid temperature of 18° C., while stirring at 500 rpm with a stirrer, to form a main Ag-plated layer.

As a result of measuring and calculating the thickness of each plating of this Ag-plated material in the same manner as in the example, the thickness of the Ag-plated layer (7 layers) was 0.613 μm, the thickness of the porous Ni-plated layer (6 layers) was 0.998 μm, the thickness of the Ag-plated layer (5 layers) was 0.825 μm, the thickness of the porous Ni-plated layer (4 layers) was 1.384 μm, the thickness of the Ag-plated layer (3 layers) was 0.637 μm, and the thickness of the porous Ni-plated layer (2 layers) was 1.415 μm, in an order from the surface side of the Ag-plated material.

As a result of evaluating the wear resistance of this Ag-plated material in the same manner as in example 1, the copper substrate was not exposed even after sliding 1000 times, and the contact resistance was less than 1 mΩ, indicating excellent wear resistance.

Further, as a result of evaluating the vibration resistance of the Ag-plated material in the same manner as in example 1, the contact resistance was less than 1 mΩ even after sliding 50,000 times, indicating excellent vibration resistance.

Further, as a result of evaluating the number density of pores on the surface of the Ag-plated material and the average diameter of the pores in the same manner as in example 1, they were 10,800/mm$^2$ and 16.2 μm, respectively.

Example 3

An Ag-plated material was produced in the same manner as in example 2, except that (the set of) (steps 3) to (steps 5) was repeated once to make a total of 5 layers.

As a result of evaluating the wear resistance of this Ag-plated material in the same manner as in example 1, the copper substrate was not exposed even after sliding 1000 times, and the contact resistance was less than 1 mΩ, indicating excellent wear resistance.

Further, as a result of evaluating the vibration resistance of the Ag-plated material in the same manner as in example 1, the contact resistance was less than 1 mΩ even after sliding 13,000 times, indicating excellent vibration resistance. (The contact resistance after sliding 20,000 times exceeded 1 mΩ.)

Further, as a result of evaluating the number density of pores on the surface of the Ag-plated material and the average diameter of the pores in the same manner as in example 1, they were 25,500/mm$^2$ and 7.1 nm, respectively.

Example 4

An Ag-plated material was produced in the same manner as in example 2, except that (the set of) (step 3) to (step 5) were repeated three times to make a total of nine layers.

As a result of evaluating the wear resistance of this Ag-plated material in the same manner as in example 1, the copper substrate was not exposed even after sliding 1000 times, and the contact resistance was less than 1 mΩ, indicating excellent wear resistance.

Further, as a result of evaluating the vibration resistance in the same manner as in example 1, the contact resistance was less than 1 mΩ even after sliding 50,000 times, indicating excellent vibration resistance.

Further, as a result of evaluating the number density of pores on the surface of the Ag-plated material and the average diameter of the pores in the same manner as in example 1, they were 23,100/mm$^2$ and 7.7 nm, respectively.

Example 5

An Ag-plated product was produced in the same manner as in example 2, except that the electroplating time of the porous Ni plating was 250 seconds and the electroplating time of the main Ag plating was 12 seconds.

As a result of measuring and calculating the thickness of each plating of this Ag-plated material in the same manner as in the example, the thickness of the Ag-plated layer (7 layers) was 0.439 μm, the thickness of the porous Ni-plated layer (6 layers) was 0.425 μm, the thickness of the Ag-plated layer (5 layers) was 0.463 μm, the thickness of the porous Ni-plated layer (4 layers) was 0.561 μm, the thickness of the Ag-plated layer (3 layers) was 0.386 μm, and the thickness of the porous Ni-plated layer (two layers) was 0.439 μm, in an order from the surface side of the Ag-plated material.

As a result of evaluating the wear resistance of this Ag-plated material in the same manner as in example 1, there was no exposure of the copper substrate even after 400 times of sliding, and the contact resistance was less than 1 mΩ, indicating excellent wear resistance.

Further, as a result of evaluating the vibration resistance of the Ag-plated material in the same manner as in example 1, the contact resistance was less than 1 mΩ even after sliding 20,000 times, indicating excellent vibration resistance (the contact resistance after sliding 30,000 times exceeded 1 mΩ).

Further, as a result of evaluating the number density of pores on the surface of the Ag-plated material and the average diameter of the pores in the same manner as in example 1, they were 43,400/mm$^2$ and 4.9 μm, respectively.

Example 6

An Ag-plated material was produced in the same manner as in example 4, except that the electroplating time of the porous Ni plating was 250 seconds and the electroplating time of the main Ag plating was 12 seconds.

As a result of evaluating the wear resistance of this Ag-plated material in the same manner as in example 1, there was no exposure of the copper substrate even after 800 times of sliding, and the contact resistance was less than 1 mΩ, indicating excellent wear resistance.

Further, as a result of evaluating the vibration resistance of the Ag-plated material in the same manner as in example 1, the contact resistance was less than 1 mΩ even after sliding 50,000 times, indicating excellent vibration resistance.

Further, as a result of evaluating the number density of pores on the surface of the Ag-plated material and the average diameter of the pores in the same manner as in example 1, they were 38,800/mm$^2$ and 4.5 μm, respectively.

Example 7

An Ag-plated material was produced in the same manner as in example 3, except that the electroplating time of the porous Ni plating was 250 seconds and the electroplating time of the main Ag plating was 12 seconds.

As a result of evaluating the wear resistance of this Ag-plated material in the same manner as in example 1, the copper substrate was not exposed even after sliding 150 times, and the contact resistance was less than 1 mΩ, indicating excellent wear resistance.

Further, as a result of evaluating the vibration resistance of the Ag-plated material in the same manner as in example 1, the contact resistance was less than 1 mΩ even after sliding 10,000 times, indicating excellent vibration resistance. (The contact resistance after sliding 15,000 times exceeded 1 mΩ.)

Further, when the number density of pores on the surface of the Ag-plated material and the average diameter of the pores were evaluated in the same manner as in example 1, they were 36,600/mm$^2$ and 6.0 μm, respectively.

Comparative Example 1

In comparative example 1, an Ag-plated material was produced in the same manner as in example 2 except that only one two-layer plating structure was formed (3 layers in total without repeating (Step 3) to (Step 5)).

As a result of evaluating the wear resistance of this Ag-plated material in the same manner as in example 1, the copper substrate was exposed after siding 100 times, indicating insufficient wear resistance.

Further, as a result of evaluating the vibration resistance of the Ag-plated material in the same manner as in example 1, the contact resistance exceeded 1 mΩ after sliding 5,000 times, indicating insufficient vibration resistance.

Further, as a result of evaluating the number density of pores on the surface of the Ag-plated material and the average diameter of the pores in the same manner as in example 1, they were 18,800/mm$^2$ and 9.0 μm, respectively.

Comparative Example 2

An Ag-plated material was produced in the same manner as in example 1, except that only one two-layer plating structure was formed (3 layers in total without repeating (Step 3) to (Step 5)), and the electroplating time for the main Ag plating was 720 seconds.

As a result of evaluating the wear resistance of this Ag-plated material in the same manner as in example 1, the copper substrate was exposed after sliding 100 times, indicting insufficient wear resistance.

Further, as a result of evaluating the vibration resistance of the Ag-plated material in the same manner as in example 1, the contact resistance exceeded 1 mΩ after sliding 2,000 times, indicating insufficient vibration resistance.

Further, as a result of evaluating the number density of pores on the surface of the Ag-plated material and the average diameter of the pores in the same manner as in example 1, they were 12,400/mm$^2$ and 9.4 μm, respectively.

Comparative Example 3

An Ag-plated material was produced in the same manner as in example 1, except that only one two-layer plating structure was formed (3 layers in total without repeating (step 3) to (step 5)), and the electroplating time for the main Ag plating was 1,200 seconds.

As a result of evaluating the wear resistance of this Ag-plated material in the same manner as in example 1, the copper substrate was exposed after sliding 100 times, indicating insufficient wear resistance.

Further, as a result of evaluating the vibration resistance of the Ag-plated material in the same manner as in example 1, the contact resistance exceeded 1 mΩ after sliding 5,000 times, indicating insufficient vibration resistance.

Further, as a result of evaluating the number density of pores on the surface of the Ag-plated material in the same manner as in example 1, no pores were found (0/mm$^2$).

Comparative Example 4

An Ag-plated material was produced in the same manner as in example 1, except that the current density at the time of porous Ni plating was 3 A/dm$^2$, the electroplating time was 165 seconds, the current density at the time of Ag strike plating was 2 A/dm$^2$, only one two-layer plating structure was formed ((Step 3) to (Step 5) was not repeated, forming 3 layers in total), and the electroplating time for the main Ag plating was 1200 seconds.

As a result of evaluating the wear resistance of this Ag-plated material in the same manner as in example 1, the copper substrate was exposed after sliding 100 times, indicating insufficient wear resistance.

Further, as a result of evaluating the number density of pores on the surface of the Ag-plated material in the same manner as in example 1, no pores were found (0/mm$^2$).

Comparative Example 5

An Ag-plated material was produced in the same manner as in comparative example 4, except that the current density at the time of porous Ni plating was 5 A/dm$^2$ and the electroplating time was 100 seconds.

As a result of evaluating the wear resistance of this Ag-plated material in the same manner as in example 1, the copper substrate was exposed after sliding 100 times, indicating insufficient wear resistance.

Further, as a result of evaluating the number density of pores on the surface of the Ag-plated material in the same manner as in example 1, no pores were found (0/mm$^2$).

Comparative Example 6

An Ag-plated material was produced in the same manner as in example 1, except that only one two-layer plating structure was formed ((Step 3) to (Step 5) were not repeated, forming 3 layers in total, and the electroplating time for this porous Ni plating was 1,500 seconds, and the electroplating time for the main Ag plating was 720 seconds.

As a result of evaluating the wear resistance of this Ag-plated material in the same manner as in example 1, the contact resistance exceeded 1 mΩ after sliding 100 times, indicating insufficient wear resistance.

Further, as a result of evaluating the vibration resistance of this Ag-plated material in the same manner as in example 1, the contact resistance exceeded 1 mΩ after sliding 3,000 times, indicating insufficient vibration resistance.

Further, as a result of evaluating the number density of pores on the surface of the Ag-plated material and the average diameter of the pores in the same manner as in example 1, they were 4,600/mm$^2$ and 31.2 μm, respectively.

Comparative Example 7

In comparative example 7, an Ag-plated material was produced in the same manner as in example 1, except that a Ni-plated layer having a thickness of 1 μm was formed without providing the underlying Ni plating, and without adding an additive (top porous nickel RSN) to the Ni plating solution in step 3 of example 1 (that is, without providing porous Ni-plated layer), and the current density of Ag strike plating was 2 A/dm$^2$.

As a result of evaluating the wear resistance of this Ag-plated material in the same manner as in example 1, the copper substrate was exposed after sliding 100 times, indicating insufficient wear resistance.

Further, as a result of evaluating the vibration resistance of this Ag-plated material in the same manner as in example 1, the contact resistance exceeded 1 mΩ after sliding 5,000 times, indicating insufficient vibration resistance.

Further, as a result of evaluating the number density of pores on the surface of the Ag-plated material in the same manner as in example 1, no pores were found (0/mm$^2$).

Comparative Example 8

In comparative example 8, an Ag-plated material was produced in the same manner as in example 2, except that a Ni-plated layer having a thickness of 1 μm was formed without providing the underlying Ni-plated layer and without adding the additive (top porous nickel RSN) to the Ni plating solution in step 3 of example 1 (that is, without providing the porous Ni-plated layer), and on top of this, only one Ag-plated layer having a thickness of 5 μm was formed, with a current density of the Ag strike plating set as 2 A/dm$^2$, and the time for the main Ag plating set as 120 seconds.

As a result of evaluating the wear resistance of this Ag-plated material in the same manner as in example 1, the copper substrate was exposed after sliding 100 times, indicating insufficient wear resistance.

Further, as a result of evaluating the vibration resistance in the same manner as in example 1, the contact resistance exceeded 1 mΩ after sliding times, indicating insufficient vibration resistance.

Further, as a result of evaluating the number density of pores on the surface of the Ag-plated material in the same manner as in example 1, no pores were found ($0/mm^2$).

FIG. 1 is a secondary electron image (2000×) of the surface of the Ag-plated material of example 1, using SEM (scanning electron microscope).

FIG. 2 is a SIM (scanning ion microscope) image of the cross section of the Ag-plated material of example 1.

Figure 3:
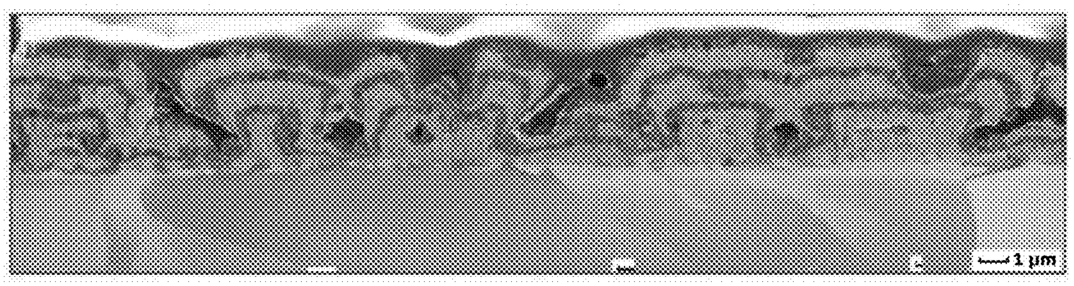
FIG. 3 is a cross-sectional SIM image of the Ag-plated material of example 5.

FIG. 3 is a SIM image of the cross section of the Ag-plated material of example 5.

Figure 4:
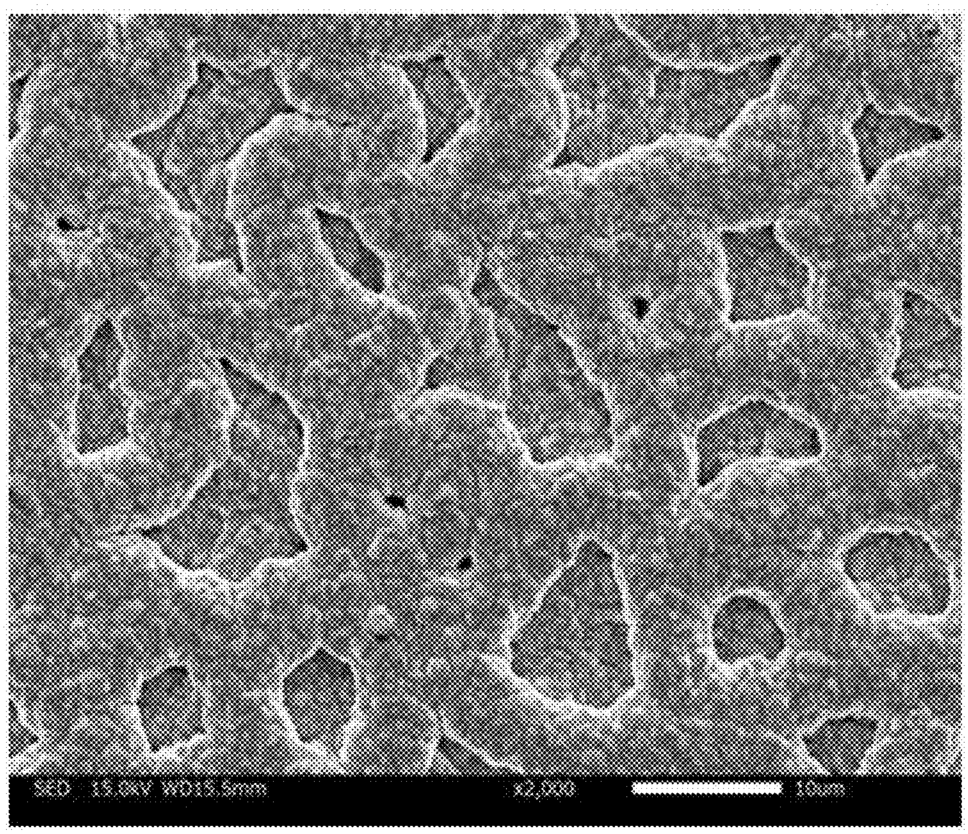
FIG. 4 is a SEM secondary electron image (2000×) of the surface of the Ag-plated material of comparative example 2.

FIG. 4 is a secondary electron image (2000×) of the surface of the Ag-plated material of comparative example 2, using SEM.

Figure 5:
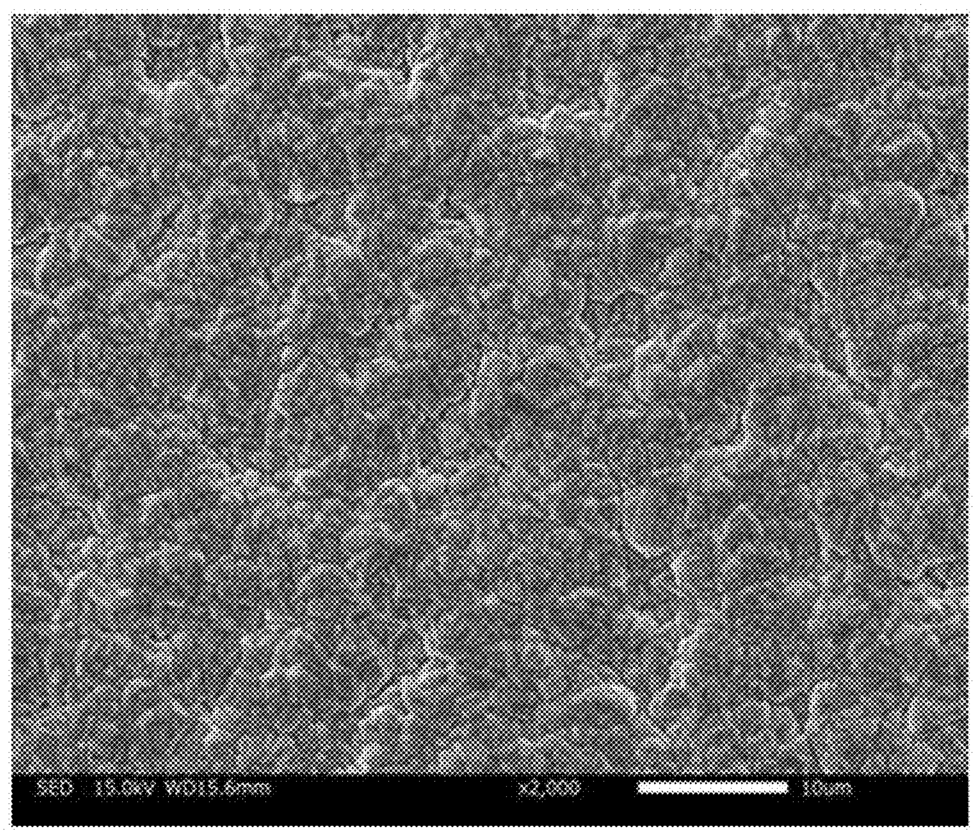
FIG. 5 is a SEM secondary electron image (2000×) of the surface of the Ag-plated material of comparative example 3.

FIG. 5 is a secondary electron image (2000×) of the surface of the Ag-plated material of comparative example 3, using SEM.

Figure 6:
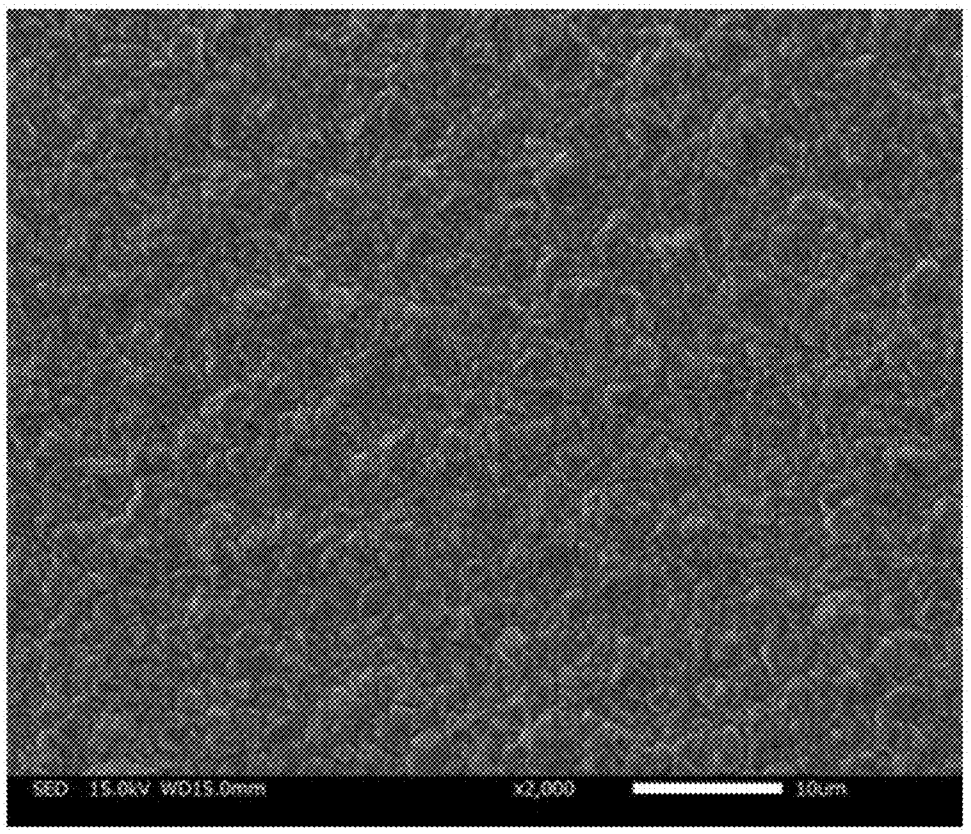
FIG. 6 is a SEM secondary electron image (2000×) of the surface of the Ag-plated material of comparative example 4.

FIG. 6 is a secondary electron image (2000×) of the surface of the Ag-plated material of comparative example 4, using SEM.

Figure 7:
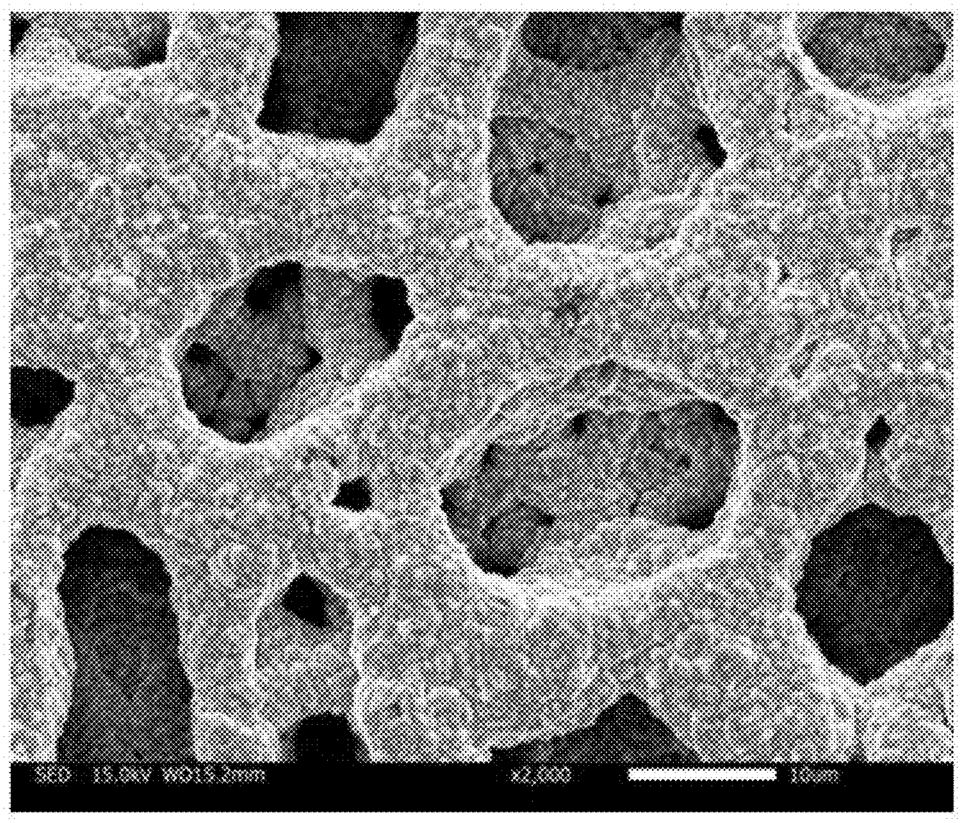
FIG. 7 is a SEM secondary electron image (2000×) of the surface of the Ag-plated material of comparative example 6.

FIG. 7 is a secondary electron image (2000×) of the surface of the Ag-plated material of comparative example 6, using SEM.

Figure 8:
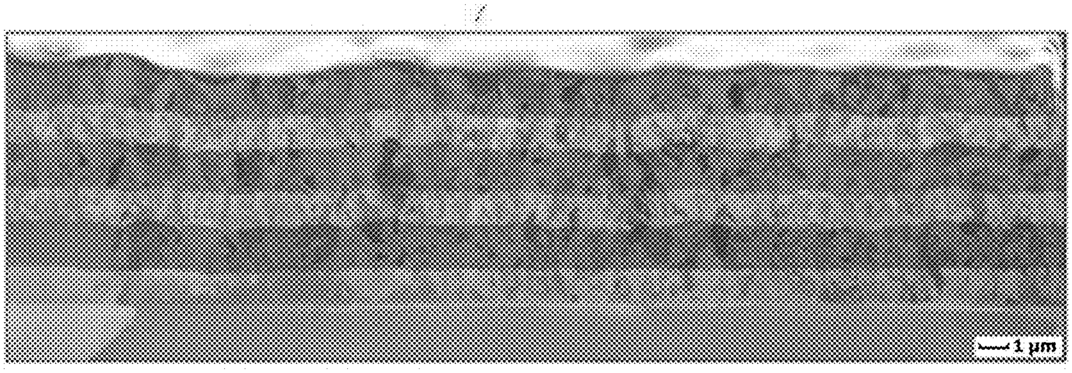
FIG. 8 is a cross-sectional SIM image of the Ag-plated material of comparative example 7.

FIG. 8 is a SIM image of the cross section of the Ag-plated material of comparative example 7.

Figure 9:
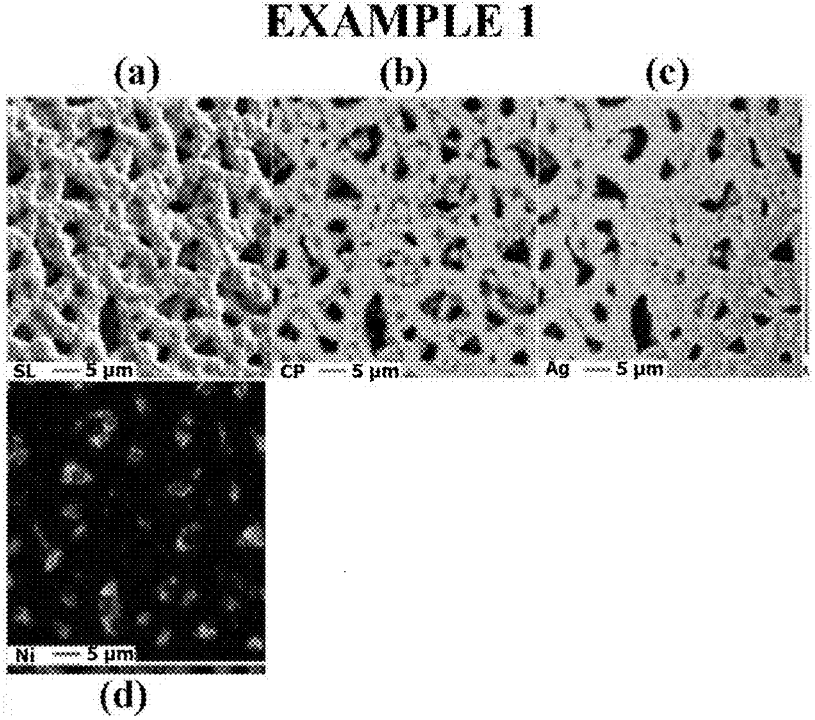
In FIG. 9, (a) is an EPMA (Electron Probe Microanalyzer) secondary electron image (2000×) of the surface of the Ag-plated material of example 1, (b) is a reflection electron composition image (2000×) of the surface of the Ag-plated material obtained using EPMA (electron probe microanalyzer), (c) is an X-ray image of the surface of properties of Ag on the surface of the Ag-plated material based on WDX (wavelength dispersive X-ray spectroscopy), using EPMA (electron probe microanalyzer), and (d) is an X-ray image of properties of Ni on the surface of the Ag-plated material based on WDX (wavelength dispersive X-ray spectroscopy), using EPMA (electron probe microanalyzer).

FIG. 9(*a*) is a secondary electron image (2000×) of the surface of the Ag-plated material of example 1, using EPMA (electron probe microanalyzer).

FIG. 9(*b*) is a reflected electron composition image (2000×) of the surface of the Ag-plated material, using EPMA (electron probe microanalyzer).

FIG. 9(*c*) is a characteristic X-ray image of Ag on the surface of the Ag-plated material based on WDX (Wavelength Dispersive X-ray Spectroscopy), using EPMA (Electron Probe Micro Analyzer).

FIG. 9(*d*) is a characteristic X-ray image of Ni on the surface of the Ag-plated material based on WDX (Wavelength Dispersive X-ray Spectroscopy), using EPMA (Electron Probe Micro Analyzer).

Figure 10:
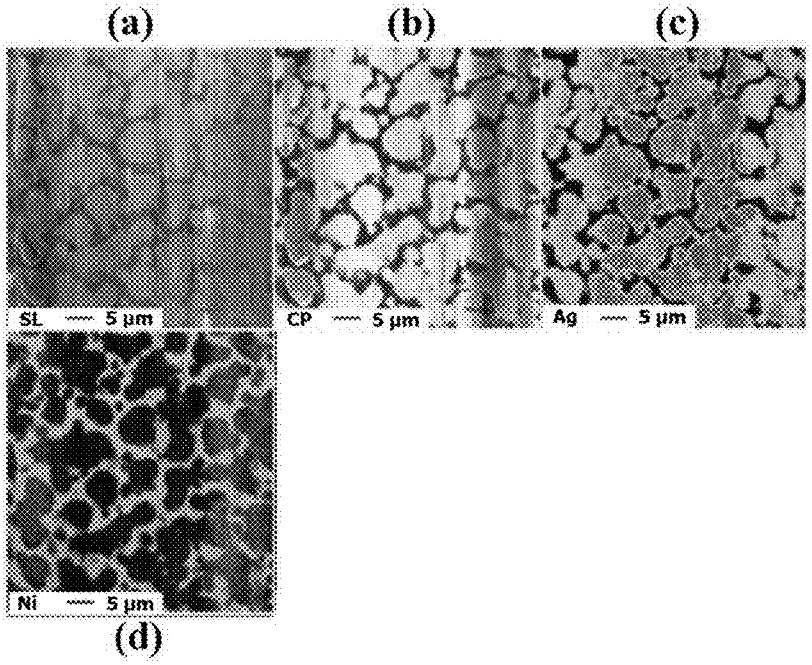
In FIG. 10, (a) is an EPMA (Electron Probe Microanalyzer) secondary electron image (2000×) of the surface of the Ag-plated material of example 1 after a wear resistance test, (b) is a reflected electron composition image (2000×) of the surface of the Ag-plated material after the wear resistance test, using an EPMA (Electron Probe Micro Analyzer), (c) is an X-ray image of properties of Ag on the surface of the Ag-plated material after the wear resistance test based on WDX (wavelength dispersive X-ray spectroscopy), using EPMA (electron probe microanalyzer), and (d) is an X-ray image of properties of Ni on the surface of the Ag-plated material after the wear resistance test based on WDX (wavelength dispersive X-ray spectroscopy), using EPMA (electron probe microanalyzer).

FIG. 10(*a*) is a secondary electron image (2000×) of the surface of the Ag-plated material of example 1 after the wear resistance test, using EPMA (Electron Probe Microanalyzer).

FIG. 10(*b*) is a reflected electron composition image (2000×) of the surface of the Ag-plated material after the wear resistance test, using EPMA (electron probe microanalyzer).

FIG. 10(*c*) is a characteristic X-ray image of Ag on the surface of the Ag-plated material after the wear resistance test based on WDX (wavelength dispersive X-ray spectroscopy), using EPMA (electron probe microanalyzer).

FIG. 10(*d*) is a characteristic X-ray image of Ni on the surface of the Ag-plated material after the wear resistance test based on WDX (wavelength dispersive X-ray spectroscopy), using EPMA (electron probe microanalyzer).

As shown in FIG. 1, in example 1, a large number of pores are formed on the surface of the Ag-plated material.

As shown in FIG. 2, in example 1, a two-layer plated structure having a porous Ni plated layer and an Ag-plated layer in this order is formed, and it can be confirmed that three sets of these two-layer plated structures are provided. Further, a large number of pores can be confirmed on the surface of the porous Ni-plated layer other than the top surface side of the Ag-plated material, and it can be confirmed that each Ag-plated layer provided directly on each porous Ni-plated layer enters the pores. This can also be confirmed in FIG. 3 showing the SIM image of the cross section of the Ag-plated material of example 5.

As shown in FIG. 9(*c*), Ag can be confirmed in a white part of the image in FIG. 9(*b*). On the other hand, as shown in FIG. 9(*d*), Ni was observed in a black part (that is, the pores formed in the Ag-plated layer) in the image of FIG. 9(*b*).

As shown in FIG. 10(*c*) after the wear resistance test of the Ag-plated material, Ag is confirmed in the white part of the image in FIG. 10(*b*), indicating that the Ag plating remains. On the other hand, as shown in FIG. in the black part of the image of FIG. 10(*b*), a portion having a higher concentration of Ni was observed in a mesh-like manner as compared with FIG. 9(*d*). It can be considered that a part of the soft Ag-plated layer on the surface was scraped off by the sliding test, and a part of the porous Ni-plated layer is exposed, resulting in such a mesh-like appearance.

As shown in Table 1, each example shows good wear resistance and vibration resistance, but each comparative example does not show the same level of wear resistance and vibration resistance as each example.

The purity of Ni in the Ni-plated layer and the porous Ni-plated layer of examples and comparative examples is 99% by mass or more, and the purity of Ag in both the Ag strike plating layer and the main Ag-plated layer is 99% by mass or more.

The invention claimed is:

1. An Ag-plated material, comprising:

a plurality of two-layer plating structures formed on a substrate that comprises a conductive metal, each two-layer plating structure of the plurality of the two-layer plating structures having a porous Ni-plated layer and an Ag-plated layer in this order from the substrate side; and an underlying Ni-plated layer between the two-layer plating structure closest to the substrate, and the substrate.

2. The Ag-plated material according to claim 1, wherein the underlying Ni-plated layer has a thickness of 0.05 to 2 μm.

3. The Ag-plated material according to claim 1, wherein the Ag-plated material has a large number of pores on its surface.

4. The Ag-plated material according to claim 3, wherein a number density of the pores is 5000 to $100{,}000/mm^2$.

5. The Ag-plated material according to claim 3, wherein the pores have an average diameter of 1 to 30 μm.

6. The Ag-plated material according to claim 1, wherein the porous Ni-plated layer has a thickness of 0.1 to 3 μm.

7. The Ag-plated material according to claim 1, wherein each Ag-plated layer of the Ag-plated material has a thickness of 0.1 to 3 μm.

8. An electrical component that is a contact or terminal component using the Ag-plated material according to claim 1 as a material.

9. A method for producing an Ag-plated material, the method comprising:

forming a plurality of two-layer plating structures on a substrate that comprises a conductive metal, wherein each two-layer plating structure of the plurality of the two-layer plating structures is formed such that it has a porous Ni-plated layer and an Ag-plated layer in this order from the substrate side on the substrate; wherein an underlying Ni-plated layer is formed between the two-layer plating structure closest to the substrate, and the substrate.

10. The method for producing an Ag-plated material according to claim 9, wherein the underlying Ni-plated layer has a thickness of 0.05 to 2 μm.

11. The method for producing an Ag-plated material according to claim 9, wherein the porous Ni-plated layer has a thickness of 0.1 to 3 μm.

12. The method for producing an Ag-plated material according to claim 9, wherein each Ag-plated layer of the Ag-plated material has a thickness of 0.1 to 3 μm.

* * * * *